United States Patent
Petersen et al.

(10) Patent No.: US 12,307,122 B1
(45) Date of Patent: May 20, 2025

(54) DATA PROCESSING AND TRANSMISSION USING HARDWARE SERIALIZATION AND DESERIALIZATION FUNCTIONS

(71) Applicant: Ethernovia Inc., San Jose, CA (US)

(72) Inventors: Brian Arnold Petersen, San Francisco, CA (US); Joseph Andonieh, Aurora (CA); Roy T. Myers, Jr., Morgan City, CA (US)

(73) Assignee: Ethernovia Inc., San Jose, CA (US)

( * ) Notice: Subject to any disclaimer, the term of this patent is extended or adjusted under 35 U.S.C. 154(b) by 325 days.

(21) Appl. No.: 17/955,315

(22) Filed: Sep. 28, 2022

Related U.S. Application Data

(60) Provisional application No. 63/261,825, filed on Sep. 29, 2021.

(51) Int. Cl.
   *G06F 3/06* (2006.01)

(52) U.S. Cl.
   CPC .......... *G06F 3/0655* (2013.01); *G06F 3/0604* (2013.01); *G06F 3/067* (2013.01)

(58) Field of Classification Search
   CPC ....... G06F 3/0655; G06F 3/0604; G06F 3/067
   See application file for complete search history.

(56) References Cited

U.S. PATENT DOCUMENTS

| | | | |
|---|---|---|---|
| 6,636,511 B1 * | 10/2003 | Roy | H04L 12/6402 370/388 |
| 7,161,937 B1 | 1/2007 | Dunning et al. | |
| 7,248,573 B2 * | 7/2007 | Harrison | H04L 12/4625 370/338 |
| 7,366,267 B1 | 4/2008 | Lee et al. | |
| 7,509,434 B1 | 3/2009 | Crosmer et al. | |
| 8,966,283 B1 | 2/2015 | Shankar et al. | |
| 9,087,138 B2 * | 7/2015 | Zhou | G06F 16/86 |
| 9,317,377 B1 | 4/2016 | Wu et al. | |
| 9,723,091 B1 | 8/2017 | Krock et al. | |
| 9,825,949 B2 | 11/2017 | Asenjo et al. | |

(Continued)

FOREIGN PATENT DOCUMENTS

| | | |
|---|---|---|
| CN | 111338567 | 6/2020 |
| CN | 111782648 | 10/2020 |

(Continued)

OTHER PUBLICATIONS

Andrew S. Tanenbaum; Structured Computer Organization; 1984; Second Edition; pp. 10-11 (Year: 1984).*

(Continued)

*Primary Examiner* — Idriss N Alrobaye
*Assistant Examiner* — Richard B Franklin
(74) *Attorney, Agent, or Firm* — Schwegman, Lundberg & Woessner, P.A.

(57) ABSTRACT

Various embodiments described herein support or provide for data communication using hardware serialization and deserialization functions, such as receiving one or more data packets from a device over a network; and using the data communication hardware to perform operations including: decapsulating the one or more data packets to retrieve a serialized byte string, deserializing the serialized byte string including converting the serialized byte string into one or more data structures, and storing the one or more data structures in a memory of the device.

20 Claims, 13 Drawing Sheets

(56) References Cited

U.S. PATENT DOCUMENTS

| | | | |
|---|---|---|---|
| 10,333,731 | B2 | 6/2019 | Ebrom et al. |
| 10,827,324 | B1 | 11/2020 | Hajimiri et al. |
| 11,172,054 | B2* | 11/2021 | Hermesh ............... H04L 69/166 |
| 12,008,259 | B1 | 6/2024 | Petersen et al. |
| 2008/0005384 | A1 | 1/2008 | Mead et al. |
| 2008/0114842 | A1 | 5/2008 | Ellis et al. |
| 2010/0191525 | A1 | 7/2010 | Rabenko et al. |
| 2011/0137991 | A1* | 6/2011 | Russell ................. G06Q 10/06 709/204 |
| 2012/0120960 | A1 | 5/2012 | Nishioka |
| 2012/0216216 | A1 | 8/2012 | Lopez et al. |
| 2015/0088924 | A1 | 3/2015 | Abadi et al. |
| 2016/0100027 | A1 | 4/2016 | Haghighi |
| 2016/0179595 | A1 | 6/2016 | Wong et al. |
| 2017/0163662 | A1 | 6/2017 | Zhou et al. |
| 2017/0269908 | A1 | 9/2017 | Tonshal et al. |
| 2017/0318031 | A1 | 11/2017 | Zhou et al. |
| 2018/0024957 | A1 | 1/2018 | Nachimuthu et al. |
| 2018/0054214 | A1 | 2/2018 | Takahashi |
| 2018/0341878 | A1 | 11/2018 | Azout et al. |
| 2019/0095946 | A1 | 3/2019 | Azout et al. |
| 2019/0121560 | A1 | 4/2019 | Keeth et al. |
| 2019/0149751 | A1 | 5/2019 | Wise |
| 2019/0278701 | A1 | 9/2019 | Enz et al. |
| 2019/0347022 | A1 | 11/2019 | Thiel et al. |
| 2019/0354310 | A1 | 11/2019 | Tsirkin |
| 2020/0151288 | A1 | 5/2020 | Ma et al. |
| 2020/0334254 | A1 | 10/2020 | Arye et al. |
| 2021/0034598 | A1 | 2/2021 | Arye et al. |
| 2021/0063200 | A1 | 3/2021 | Kroepfl et al. |
| 2021/0117360 | A1 | 4/2021 | Kutch et al. |
| 2021/0250812 | A1 | 8/2021 | Caswell |
| 2021/0264349 | A1 | 8/2021 | Marappagounder |
| 2022/0107753 | A1 | 4/2022 | Kumar et al. |
| 2022/0269513 | A1 | 8/2022 | Su |

FOREIGN PATENT DOCUMENTS

| | | |
|---|---|---|
| CN | 111783289 | 10/2020 |
| CN | 111783290 | 10/2020 |
| CN | 112712842 | 4/2021 |
| CN | 113518094 | 10/2021 |
| EP | 3012740 | 4/2016 |
| WO | 2005052754 | 6/2005 |

OTHER PUBLICATIONS

"U.S. Appl. No. 17/955,324, Non Final Office Action mailed Dec. 7, 2023", 15 pgs.

"U.S. Appl. No. 17/955,324, Response filed Dec. 29, 2023 to Non Final Office Action mailed Dec. 7, 2023", 14 pgs.

"U.S. Appl. No. 17/955,324, Examiner Interview Summary mailed Jan. 2, 2024", 2 pgs.

"U.S. Appl. No. 17/955,324, Notice of Allowance mailed Feb. 8, 2024", 8 pgs.

"U.S. Appl. No. 17/955,324, 312 Amendment filed Feb. 27, 2024", 6 pgs.

"U.S. Appl. No. 17/955,324, PTO Response to Rule 312 Communication mailed Mar. 21, 2024", 2 pgs.

"U.S. Appl. No. 17/955,317, Non Final Office Action mailed Jun. 18, 2024", 10 pgs.

"U.S. Appl. No. 17/955,307, Notice of Allowance mailed Aug. 7, 2024", 9 pgs.

"U.S. Appl. No. 17/955,307, Supplemental Notice of Allowability mailed Aug. 27, 2024", 2 pgs.

"U.S. Appl. No. 17/955,317, Examiner Interview Summary mailed Sep. 11, 2024", 2 pgs.

"U.S. Appl. No. 17/955,317, Response filed Sep. 11, 2024 to Non Final Office Action mailed Jun. 18, 2024", 13 pgs.

"U.S. Appl. No. 17/955,317, Notice of Allowance mailed Oct. 24, 2024", 7 pgs.

"U.S. Appl. No. 17/955,307, Notice of Allowance mailed Nov. 26, 2024", 9 pgs.

"U.S. Appl. No. 18/588,562, Non Final Office Action mailed Nov. 26, 2024", 18 pgs.

"Structured arrays", The Spicy community, [Online] Retrieved from the internet:https: numpy.Org doc 1.13 userbasics.rec.html, (Jun. 10, 2017), 1-6.

"U.S. Appl. No. 18/588,581, Non Final Office Action mailed Nov. 26, 2024", 11 pgs.

Anonymous, "Structured Data: NumPy's Structured Arrays", [Online] Retrieved from the internet:https: web.archive.org web 20170831205141 https: jakevdp.github.io PythonDataScienceHandbook 02.09-structured-data-numpy.html, (Aug. 21, 2017), 1-7.

Anonymous, "Explain the advantages and disadvantages of RPC", [Online] Retrieved from the internet:https: web.archive.org web 20180114103234 https: www.careerride.com RMI-advantages-and-disadvantages-of-RPC.aspx#google_vignette, (Jan. 14, 2018), 1-4.

Arslan, "NanoTransport: A Low-Latency, Programmable Transport Layer for NICs", Stanford University, (2021), 14 pgs.

Giuseppe, "Custom Struct Serialization for Networking in Unreal Engine", [Online]. Retrieved from the Internet: http:www.aclockworkberry.com custom-struct-serialization-for-networking-in-unreal-engine, (2016), 8 pgs.

Hazelcase, "What Is Deserialization?", (Jun. 14, 2021), 1-3.

Ibanez, "The nanoPU: A Nanosecond Network Stack for Datacenters", USENIX Association, (2021), 239-256.

Microsoft, "Computer Dictionary", Fifth Edition, (2002), p. 122, 329, and 390.

Radostaw, Sokol, "Serialization of data structures in the C++ programming language using the reflection information", [Online]. Retrieved from the Internet: https: web.archive.Org web 20200710005734 https: dspace5.zcu.cz bitstream 11025 25932 1 Sokol.pdf, (2020), 2 pgs.

* cited by examiner

DATA PROCESSING AND TRANSMISSION USING HARDWARE SERIALIZATION AND DESERIALIZATION FUNCTIONS

CROSS-REFERENCE TO RELATED APPLICATIONS

This application claims the benefit of U.S. Provisional Application No. 63/261,825, filed Sep. 29, 2021, entitled "Method of Hardware Acceleration of Remote Procedure Call," which is incorporated herein by reference in its entirety.

TECHNICAL FIELD

The present disclosure generally relates to data communication and, more particularly, various embodiments described herein provide for systems, methods, techniques, instruction sequences, and devices that facilitate data processing and data transmission using hardware serialization and hardware deserialization functions.

BACKGROUND

Data management systems face challenges with respect to handling data processing and data transmission (hereafter, data processing and transmission) using software-based network socket implementations. Specifically, a user-space process has to request data from a remote process and point to the location in the local virtual memory where the requested data has to be deposited. Thereafter, the operating system takes over the processing of the data. Under this approach, the requested data has to be copied from buffer to buffer while the system traverses the protocol stack. Each of these copies, as well as the protocol logic itself, is performed by a central processing unit (CPU), thereby taking valuable instruction cycles that could have been applied to much more productive functions.

BRIEF DESCRIPTION OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some embodiments are illustrated by way of embodiments, and not limitations, in the accompanying figures.

DETAILED DESCRIPTION

Figure 1:
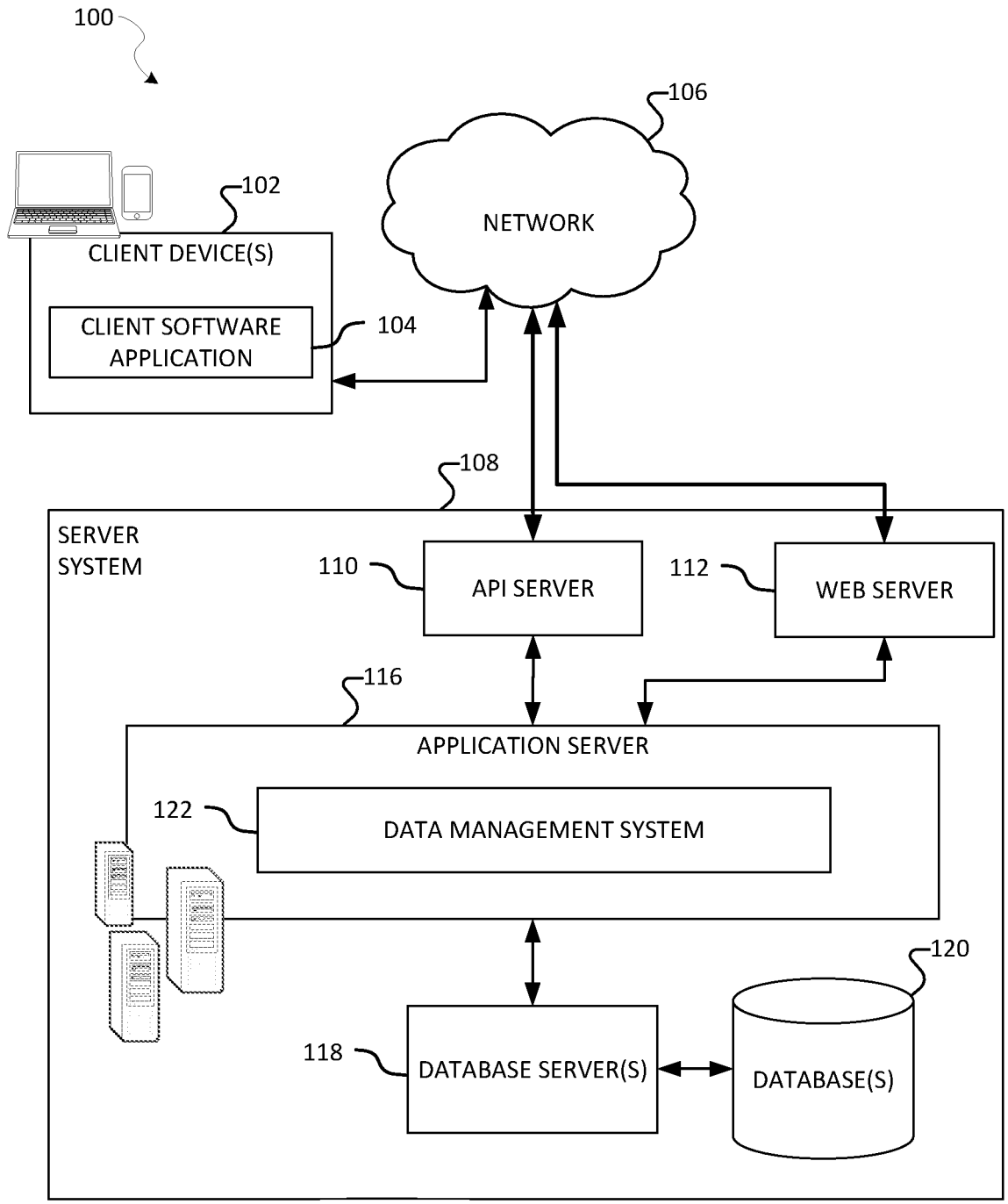
FIG. 1 is a block diagram showing an example data system that includes a data management system, according to various embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter can be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described can be practiced without the specific details presented herein, or in various combinations, as described herein. Furthermore, well-known features can be omitted or simplified in order not to obscure the described embodiments. Various embodiments may be given throughout this description. These are merely descriptions of specific embodiments. The scope or meaning of the claims is not limited to the embodiments given.

Various embodiments include systems, methods, and non-transitory computer-readable media that facilitate data processing and transmission using hardware serialization and hardware deserialization functions. Specifically, a data management system identifies structured data, as described herein, from local memory for network transmission. The data management system uses local hardware (e.g., data communication hardware, such as a network interface controller) associated with the sender device to serialize the structured data into a serialized byte string. The data management system generates one or more messages based on the serialized byte string and divides the one or more messages into one or more data packets that are compatible with network protocols for transmission. The data management system appends a header to each data packet before transmitting the data packets over a network to a recipient device (e.g., a computer). On the receiving side, the recipient device uses local hardware (e.g., data communication hardware, such as a network interface controller) to deserialize the one or more received data packets to retrieve the structured data before storing it in local memory for processing. This approach significantly reduces system latency and CPU overhead by implementing nearly all of the required operations (e.g., serialization, encapsulation, decapsulation, and deserialization) in hardware, as well as by eliminating software-driven buffer to buffer memory copies. This approach can also support remote procedure calls and data transfers.

In various embodiments, structured data represents programming language (e.g., C++) structs that are intended for use within user-space applications. Structured data can include an arbitrary set of variables of various types, such as integers, floats, strings, Booleans, and collections thereof. A variable can be a data structure, a member of a data structure (e.g., nesting of data structure), or an array of data structures. An array is a list of variables of the same type (e.g., an array of integers, an array of data structures).

Hardware Serialization

In various embodiments, a data management system receives, at data communication hardware (e.g., a network interface controller) of a device (e.g., first electronic device), structured data from a software application operated by a processor of the device. In various embodiments, a network interface controller can include one or more serialization microprocessors and one or more deserialization microprocessors to perform various operations as described herein. The device (and the structured data) is associated with one or more hardware parameters. The processor of the device can either be external to or integrated into the same device that contains the communication hardware.

In various embodiments, the data management system uses the data communication hardware to serialize the structured data to generate a serialized byte string based on the one or more hardware parameters.

In various embodiments, the data management system uses the data communication hardware to generate one or more data packets based on the serialized byte string. In various embodiments, the data management system uses the data communication hardware to generate one or more messages that include the serialized byte string. Each message includes one or more variables, such as integers, floats, strings, Booleans, and collections thereof. A variable can also be a data structure, a member of a data structure (e.g., nesting of data structures), or an array of data structures. Upon determining that the one or more messages cannot be included in a single data packet, the data management system uses the data communication hardware to divide the one or more messages into multiple data packets for transmission over a network.

In various embodiments, the one or more data packets are generated further based on one or more network protocols, including Remote Direct Memory Access (RDMA) over Converged Ethernet Version 2 (RoCEv2) network protocol, User Datagram Protocol (UDP), Internet Protocol version 4 (IPv4), Internet Protocol version 4 (TPv6), and Ethernet protocol.

In various embodiments, the data management system uses the data communication hardware to append one or more headers to the one or more data packets. The one or more headers can include a plurality of network parameters. In various embodiments, the one or more headers include one or more serialization protocol-specific headers and one or more network parameters that are associated with one or more network protocols. The serialization protocol-specific headers indicate the program to run to process the associated payload data.

In various embodiments, the data management system uses the data communication hardware to transmit, via a network operatively coupled to the data communication hardware, the one or more data packets (with the one or more headers appended) to a second electronic device based on the plurality of network parameters.

In various embodiments, before causing the data communication hardware to serialize structured data (also referred to as data structures), the data management system uses the data communication hardware to determine a length value for each of the variables included in the one or more messages. Upon determining each variable's length value (e.g., variable length value), the data management system uses (or causes) the data communication hardware to encode the length values into the serialized byte string during serialization. A length value of a variable represents the length of data content of the variable.

In various embodiments, the data management system uses the data communication hardware to determine a length value of a message (e.g., message length value) based on a sum (or total value) of the length values of the variables included in the message.

In various embodiments, a message can be a parent message and includes one or more child messages. A length value of the parent message can be determined based on one or more length values of the one or more child messages. For example, a length value of a parent message can be the total length value of one or more child messages.

In various embodiments, the data management system uses the data communication hardware to generate a lengths list based on the plurality of variable length values determined for the plurality of variables. In various embodiments, an order of the plurality of variable length values arranged in the lengths list can differ from the order of the plurality of variable length values used for serialization.

In various embodiments, the data management system uses the data communication hardware to generate one or more tags for the one or more messages. Each tag describes a message type and a message value of a corresponding message. In various embodiments, the data management system uses the data communication hardware to encode the one or more tags into the serialized byte string.

In various embodiments, during serialization, the data management system uses the data communication hardware to convert the one or more data structures included in the structured data into the serialized byte string.

In various embodiments, the data communication hardware includes a network interface controller, among other hardware components of the data communication hardware, and performs various operations as described herein. Specifically, the data management system causes the network interface controller of the sender device to perform serialization, encapsulation, and transmission operations as described herein. The data management system causes the network interface controller of the recipient device to perform deserialization and decapsulation operations as described herein.

Hardware Deserialization

In various embodiments, the data management system receives the one or more data packets from the sender device over a network. The data management system uses a data communication hardware associated with the recipient device to decapsulate the one or more data packets to retrieve the serialized byte string from the one or more data packets. The serialized byte string can be divided into multiple messages, or be included in a single message, as described herein.

Upon retrieving the serialized byte string, the data management system uses the data communication hardware to deserialize the serialized byte string by converting the serialized byte string into one or more data structures (also referred to as structured data) and storing the one or more data structures in a local memory of the recipient device. The local memory of the recipient device can be on-chip memory or off-chip memory.

In various embodiments, the data management system uses the data communication hardware to extract one or more tags, as described herein, from the one or more data packets.

In various embodiments, the data communication hardware can operate in a proactive mode at initialization and switch to a reactive mode when executing certain instructions. In various embodiments, the data communication hardware can include a deserialization microprocessor with two fundamental operation modes: proactive and reactive. At the launch of every program, the deserialization microprocessor starts off in proactive mode. While in proactive mode, certain instructions can cause the processor to switch to the reactive mode. Certain other instructions or conditions automatically switch the processor into the proactive mode. Specifically, the data management system uses the data communication hardware to identify a tag (e.g., the first tag) associated with a message from one or more messages. Upon determining that the tag is mapped to an instruction pointer, the data management system uses the data communication hardware to cause the data communication hardware to operate in a reactive mode to execute an instruction associated with the instruction pointer. Subsequently, in various embodiments, the data management system identifies a second tag associated with a second message from the one or more messages. Upon determining that the second tag is mapped to another instruction pointer (e.g., a second instruction pointer) associated with another instruction (e.g., a second instruction) that is of a different type compared to the previous instruction (e.g., the first instruction), the data management system uses the data communication hardware to cause the data communication hardware to revert to the proactive mode (default mode) to execute the second instruction and sequential instructions.

In various embodiments, the data management system processes the one or more data structures from the local memory of the recipient device based on the one or more tags extracted from the one or more data packets. The one or more data packets include one or more serialization protocol-specific headers that are associated with one or more network protocols, the one or more network protocols comprising at least one of Scalable Service-Oriented Middleware over IP (SOME/IP) protocol, Protocol Buffers protocol, or Thrift protocol.

In various embodiments, the one or more data structures stored in the local memory are in-memory representations of one or more messages that include the serialized byte string. In various embodiments, the serialized byte string can be generated by a device based on the one or more messages.

In various embodiments, a sender device can include one or more serialization microprocessors. A recipient device can include one or more deserialization microprocessors. In various embodiments, a sender device and a recipient device can each include one or more serialization microprocessors and one or more deserialization microprocessors.

In various embodiments, a data communication hardware, such as a network interface controller, can include one or more serialization microprocessors and deserialization microprocessors.

Customized Compiler and Software Application on Sending Side

In various embodiments, the data management system identifies structured data that needs to be transmitted to a recipient device and identifies definition data that defines the structured data.

In various embodiments, the data management system generates description files based on the definition data and uses a customized compiler to generate source code defining a class that incorporates the structure data. The class includes a definition of a serialization function that causes the data communication hardware to serialize the data stored in the class. In various embodiments, the customized compiler is configured to generate a plurality of hardware parameters that are used for serialization. The plurality of hardware parameters can include a pointer that identifies a location of a new instance of the class in the memory of the sender device and a plurality of identifiers of message types.

In various embodiments, the data management system generates a new instance of the class, including populating instance variables in the class with values to be serialized. In various embodiments, the data management system generates the new instance of the class using the source code that defines the class.

In various embodiments, the data management system calls the serialization function of a new instance of the class to cause the data communication hardware of the sender device to serialize. The serialization is at least based on the plurality of hardware parameters and the data stored in the class.

In various embodiments, the plurality of hardware parameters can include a pointer that identifies a location of a new instance of the class in a memory of the device and a plurality of identifiers of message types.

In various embodiments, the data management system sends (or causes a sender device to send) a request to a recipient device to coordinate the transmission of a new instance of the class. In response to the request, the data management system receives from the recipient device a plurality of hardware parameters associated with the recipient device.

In various embodiments, the data management system causes the data communication hardware associated with the sender device to serialize the new instance of the class based on the received plurality of hardware parameters associated with the recipient device. In various embodiments, the received plurality of hardware parameters associated with the recipient device can include one or more of a virtual memory location, a memory size, and a plurality of message types.

Software Application on Receiving Side

In various embodiments, upon receiving the one or more data packets from the sender device, the data management system determines that one or more headers indicate that the payload data includes serialized data. Each data packet includes a header and payload data.

In various embodiments, upon determining that a data packet includes serialized data, the data management system causes a data communication hardware to store the data packet in a temporary buffer of the data communication hardware that includes a plurality of received data packets for deserialization.

In various embodiments, the data management system determines that the payload data includes raw data that does not require header stripping, length truncation, or payload transformation. Based on the determination, the data management system causes a data communication hardware to store the raw data directly in the memory of the recipient device.

In various embodiments, the data management system causes a data communication hardware to deserialize before storing the deserialized data (e.g., data structures) in the memory of the recipient device, as described herein.

Reference will now be made in detail to embodiments, embodiments of which are illustrated in the appended drawings. The present disclosure may, however, be embodied in many different forms and should not be construed as being limited to the embodiments set forth herein.

FIG. 1 is a block diagram showing an example data system 100 that includes a data management system (hereafter, the data management system 122, or system 122), according to various embodiments. As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

Figure 2:
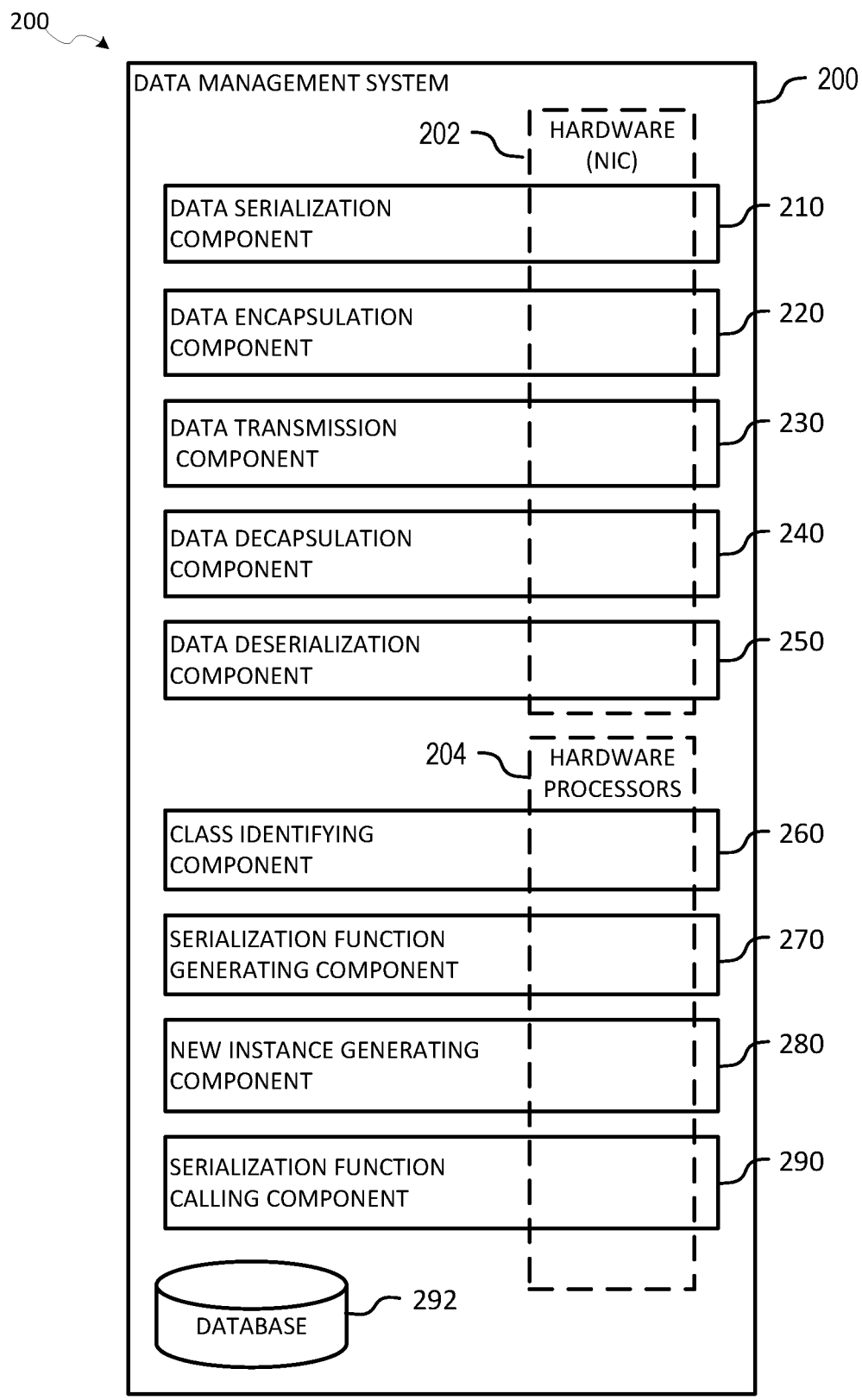
FIG. 2 is a block diagram illustrating an example data management system, according to various embodiments.

In various embodiments, each client device 102 can be a sender device that transmits data over network 106, or a recipient device that receives data over network 106. Each client device can include one or more data communication hardware (e.g., a network interface controller), that performs various operations as described herein. In various embodiments, a data communication hardware can include a number of hardware components (e.g., components 210-250 as illustrated in FIG. 2) that perform specific operations as described herein. In various embodiments, a network interface controller can include (or communicatively coupled to) the one or more of the hardware components (e.g., components 210-250, as illustrated in FIG. 2).

The server system 108 provides server-side functionality via the network 106 to the client software application 104. While certain functions of the data system 100 are described herein as being performed by the data management system 122 on the server system 108, it will be appreciated that the location of certain functionality within the server system 108 is a design choice. It can be technically preferable to initially deploy certain technology and functionality within the server system 108, but to later migrate this technology and functionality to the client software application 104 where the client device 102 provides various operations as described herein.

The server system 108 supports various services and operations that are provided to the client software application 104 by the data management system 122. Such operations include transmitting data from the data management system 122 to the client software application 104, receiving data from the client software application 104 to the system 122, and the system 122 processing data generated by the client software application 104. Data exchanges within the data system 100 can be invoked and controlled through operations of software component environments available via one or more endpoints, or functions available via one or more user interfaces of the client software application 104, which can include web-based user interfaces provided by the server system 108 for presentation at the client device 102.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that can be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the data management system 122 of the application server 116.

The application server 116 hosts a number of applications and subsystems, including the data management system 122, which supports various functions and services with respect to various embodiments described herein.

The application server 116 is communicatively coupled to a database server 118, which facilitates access to database 120, which stores data associated with the data management system 122.

FIG. 2 is a block diagram illustrating an example data management system 200, according to various embodiments. For some embodiments, the data management system 200 represents an example of the data system 100 described with respect to FIG. 1. As shown, the data management system 200 comprises hardware components, including one or more of a data serialization component 210, a data encapsulation component 220, a data transmission component 230, a data decapsulation component 240, and a data deserialization component 250. A network interface controller can include one or more components 210-250.

The data management system 200 further comprises software components that are implemented by one or more hardware processors 202. The software components include one or more of a class identifying component 260, a serialization function generating component 270, a new instance generating component 280, and a serialization function calling component 290. The data management system 200 further comprises a database 292 that stores data generated by the hardware components and software components, as described herein.

In various embodiments, the data serialization component 210 is configured to serialize structured data to generate a serialized byte string based on the one or more hardware parameters. The serialization process is a two-phase process. In the first phase, the data serialization component 210 is configured to determine the length values of variables and the one or more messages that include the variables. In the second phase, the data serialization component 210 is configured to perform serialization of structured data, including converting data structures into serialized byte strings, as described herein.

In various embodiments, the data encapsulation component 220 is configured to generate one or more data packets based on the serialized byte string and append one or more headers to the one or more data packets. In various embodiments, the one or more headers include one or more serialization protocol-specific headers and one or more network parameters that are associated with one or more network protocols.

In various embodiments, the data transmission component 230 is configured to transmit the one or more data packets (appended with the one or more headers) to a recipient device based on the plurality of network parameters.

In various embodiments, the data decapsulation component 240 is configured to decapsulate the one or more data packets to retrieve the serialized byte string. The serialized byte string can be divided into multiple messages during packetizing or be included in a single message, as described herein.

In various embodiments, the data deserialization component 250 is configured to deserialize the serialized byte string, including converting the serialized byte string into one or more data structures and storing the one or more data structures in a local memory of the recipient device.

In various embodiments, the class identifying component 260 is configured to identify structured data that needs to be transmitted to a recipient device and identifies definition data that defines the structured data.

In various embodiments, the serialization function generating component 270 is configured to generate description files based on the definition data and uses a customized compiler to generate source code defining a class that incorporates the structured data. The class includes a definition of a serialization function that causes the data communication hardware to serialize the data stored in the class.

In various embodiments, the new instance generating component 280 is configured to generate a new instance of the class, including populating instance variables in the class with values to be serialized. In various embodiments, the new instance generating component 280 is configured to generate the new instance of the class using the source code that defines the class.

In various embodiments, the serialization function calling component 290 is configured to call the serialization function of a new instance of the class to cause the data communication hardware of the sender device to serialize. The serialization is at least based on the plurality of hardware parameters and the data stored in the class.

Figure 3:
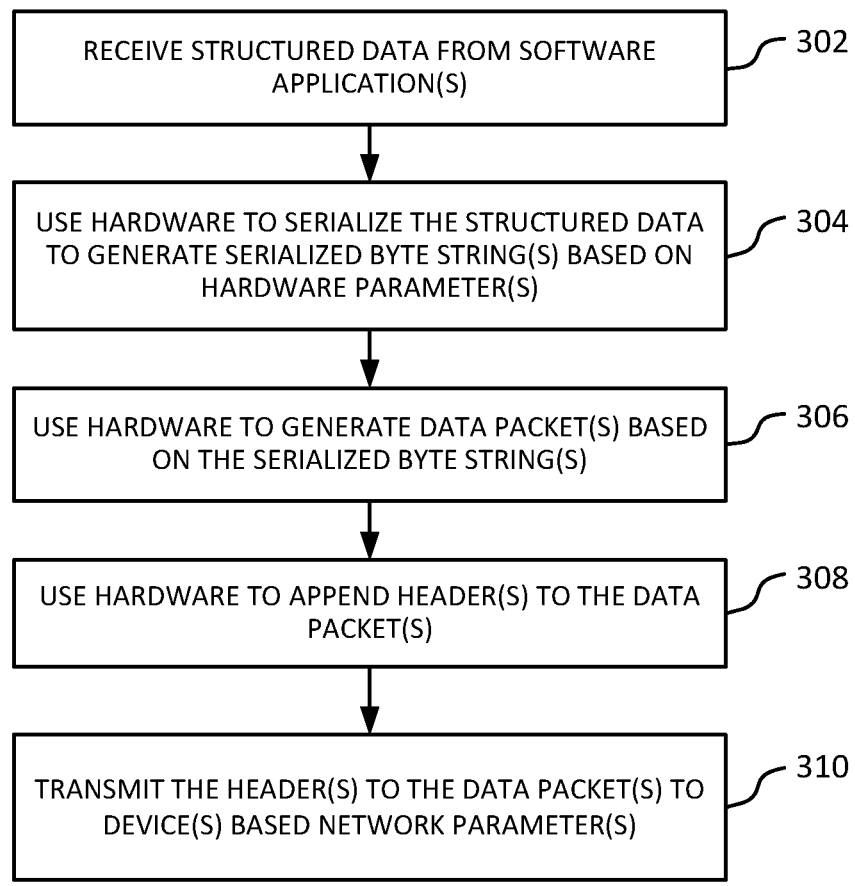
FIGS. 3 through 8 are flowcharts illustrating example methods for managing data, according to various embodiments.

FIG. 3 is a flowchart illustrating an example method 300 for managing data, according to various embodiments. It will be understood that methods described herein can be performed by a machine in accordance with some embodiments. Method 300 can be performed by the data management system 122 described with respect to FIG. 1, the data management system 200 described with respect to FIG. 2, or individual components thereof. An operation of various methods described herein can be performed by one or more data communication hardware (e.g., a network interface controller) and/or one or more hardware processors (e.g., central processing units or graphics processing units) of a computing device (e.g., a desktop, server, laptop, mobile phone, tablet, etc.), which can be part of a computing system based on a cloud architecture. Embodiment methods described herein can also be implemented in the form of executable instructions stored on a machine-readable medium or in the form of electronic circuitry. For instance, the operations of method 300 can be represented by executable instructions that, when executed by a data communication hardware or a processor of a computing device, cause the computing device to perform method 300. Depending on the embodiment, an operation of an example method described herein can be repeated in different ways or involve intervening operations not shown. Though the operations of embodiment methods can be depicted and described in a certain order, the order in which the operations are performed can vary among embodiments, including performing certain operations in parallel.

At operation 302, a data communication hardware receives structured data from one or more software applications operated by a processor of a device.

At operation 304, a data communication hardware serializes the structured data to generate a serialized byte string based on the one or more hardware parameters associated with the sender device.

At operation 306, a data communication hardware generates one or more data packets based on the serialized byte string. In various embodiments, the data communication hardware generates one or more messages that include the serialized byte string. Each message can include one or more variables, such as integers, floats, strings, Booleans, and collections thereof. A variable can also be a data structure, a member of a data structure (e.g., nesting of data structure), or an array of data structures. Upon determining that the one or more messages cannot be included in a single data packet, the data communication hardware divides the one or more messages into multiple data packets for transmission over a network.

At operation 308, a data communication hardware appends one or more headers to the one or more data packets. The one or more headers can include a plurality of network parameters. In various embodiments, the one or more headers include one or more serialization protocol-specific headers and one or more network parameters that are associated with one or more network protocols.

At operation 310, a data communication hardware transmits, via a network operatively coupled to the data communication hardware, the one or more data packets (with the appended one or more headers) to a recipient device based on the plurality of network parameters.

Though not illustrated, method 300 can include an operation where a graphical user interface for managing data can be displayed (or caused to be displayed) by the hardware processor. For instance, the operation can cause a computing device to display the graphical user interface for managing data across a variety of data sources. This operation for displaying the graphical user interface can be separate from operations 302 through 310 or, alternatively, form part of one or more of operations 302 through 310.

Figure 4:
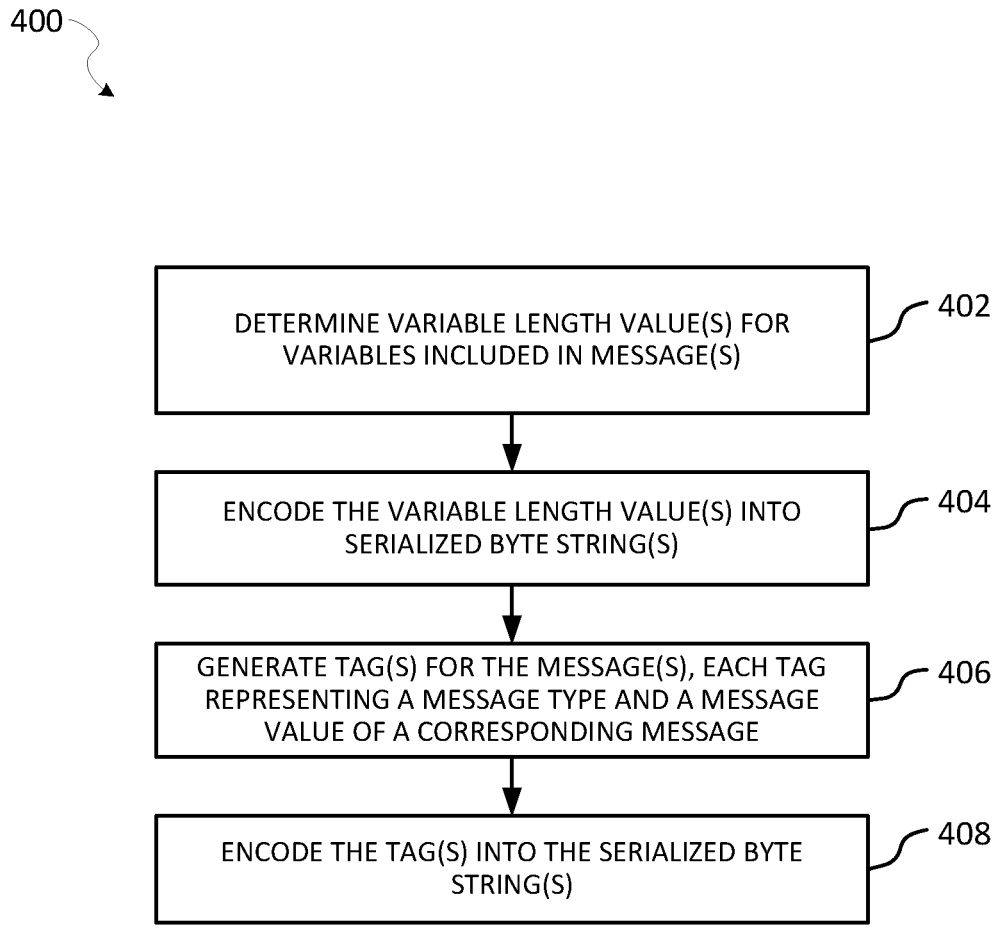

FIG. 4 is a flowchart illustrating an example method 400 for managing data, according to various embodiments. It will be understood that methods described herein can be performed by a machine in accordance with some embodiments. For embodiment, method 400 can be performed by the data management system 122 described with respect to FIG. 1, the data management system 200 described with respect to FIG. 2, or individual components thereof. An operation of various methods described herein can be performed by one or more data communication hardware (e.g., a network interface controller) and/or one or more hardware processors (e.g., central processing units or graphics processing units) of a computing device (e.g., a desktop, server, laptop, mobile phone, tablet, etc.), which can be part of a computing system based on a cloud architecture. Embodiment methods described herein can also be implemented in the form of executable instructions stored on a machine-readable medium or in the form of electronic circuitry. For instance, the operations of method 400 can be represented by executable instructions that, when executed by a data communication hardware or a processor of a computing device, cause the computing device to perform method 400.

Depending on the embodiment, an operation of an example method described herein can be repeated in different ways or involve intervening operations not shown. Though the operations of embodiment methods can be depicted and described in a certain order, the order in which the operations are performed can vary among embodiments, including performing certain operations in parallel.

At operation 402, a data communication hardware determines a length value for each of the variables included in the one or more messages.

At operation 404, upon determining each variable's length value (e.g., variable length value), a data communication hardware encodes the length values of the variables into the serialized byte strings during serialization. A length value of a variable represents a length of data content of the variable.

In various embodiments, a data communication hardware determines a length value of a message (e.g., message length value) based on a sum (or total value) of the length values of the variables included in the message. A message can be a parent message and includes one or more child messages. A length value of the parent message can be determined based on one or more length values of the one or more child messages. In various embodiments, a data communication hardware encodes message length values into serialized byte strings during serialization.

At operation 406, a data communication hardware generates one or more tags for one or more messages. Each tag describes a message type and a message value of a corresponding message.

At operation 408, a data communication hardware encodes the one or more tags to the serialized byte string.

Though not illustrated, method 400 can include an operation where a graphical user interface for managing data can be displayed (or caused to be displayed) by the hardware processor. For instance, the operation can cause a computing device to display the graphical user interface for managing data across a variety of data sources. This operation for displaying the graphical user interface can be separate from operations 402 through 408 or, alternatively, form part of one or more of operations 402 through 408.

Figure 5:
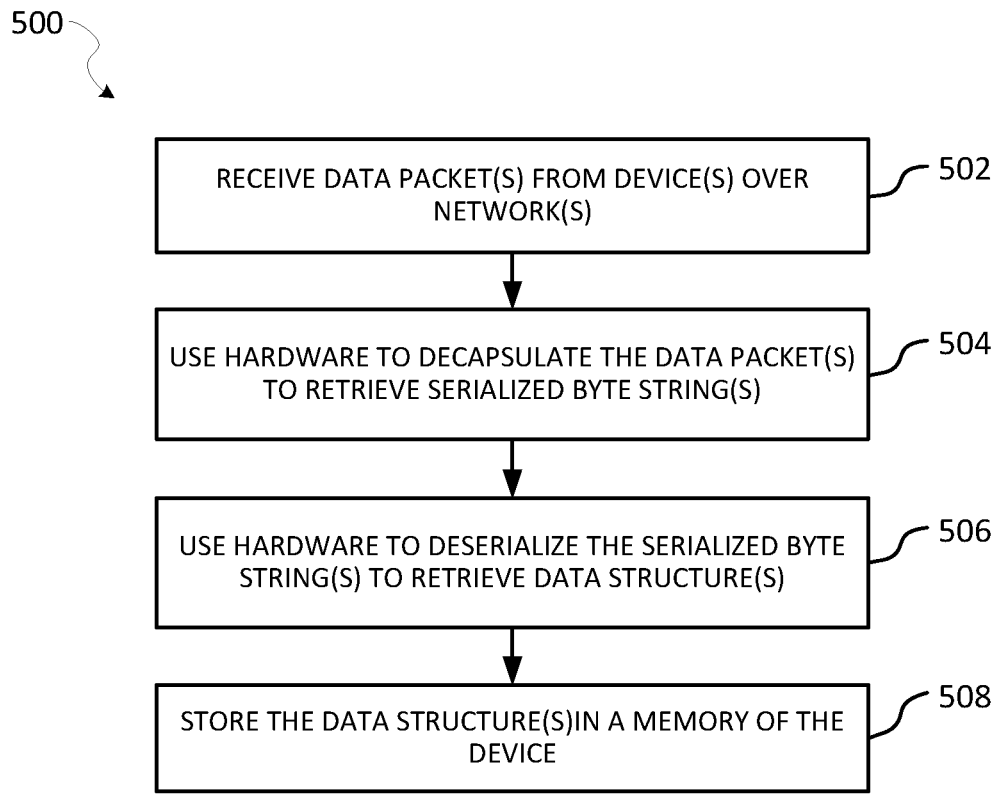

FIG. 5 is a flowchart illustrating an example method 500 for managing data, according to various embodiments. It will be understood that embodiment methods described herein can be performed by a machine in accordance with some embodiments. In some embodiments, method 500 can be performed by the data management system 122 described with respect to FIG. 1, the data management system 200 described with respect to FIG. 2, or individual components thereof. An operation of various methods described herein can be performed by one or more data communication hardware (e.g., a network interface controller) and/or one or more hardware processors (e.g., central processing units or graphics processing units) of a computing device (e.g., a desktop, server, laptop, mobile phone, tablet, etc.), which can be part of a computing system based on a cloud architecture. Embodiment methods described herein can also be implemented in the form of executable instructions stored on a machine-readable medium or in the form of electronic circuitry. For instance, the operations of method 500 can be represented by executable instructions that, when executed by a data communication hardware or a processor of a computing device, cause the computing device to perform method 500. Depending on the embodiment, an operation of an example method described herein can be repeated in different ways or involve intervening operations not shown. Though the operations of embodiment methods can be depicted and described in a certain order, the order in which the operations are performed can vary among embodiments, including performing certain operations in parallel.

At operation 502, one or more data packets from the sender device are received at a data communication hardware.

At operation 504, a data communication hardware decapsulates the one or more data packets to retrieve a serialized byte string.

At operation 506, upon retrieving the serialized byte string, a data communication hardware deserializes the serialized byte string by converting the serialized byte string into one or more data structures.

At operation 508, a data communication hardware stores the one or more data structures in a memory of the recipient device.

Though not illustrated, method 500 can include an operation where a graphical user interface for managing data can be displayed (or caused to be displayed) by the hardware processor. For instance, the operation can cause a computing device to display the graphical user interface for managing data across a variety of data sources. This operation for displaying the graphical user interface can be separate from operations 502 through 508 or, alternatively, form part of one or more of operations 502 through 508.

Figure 6:
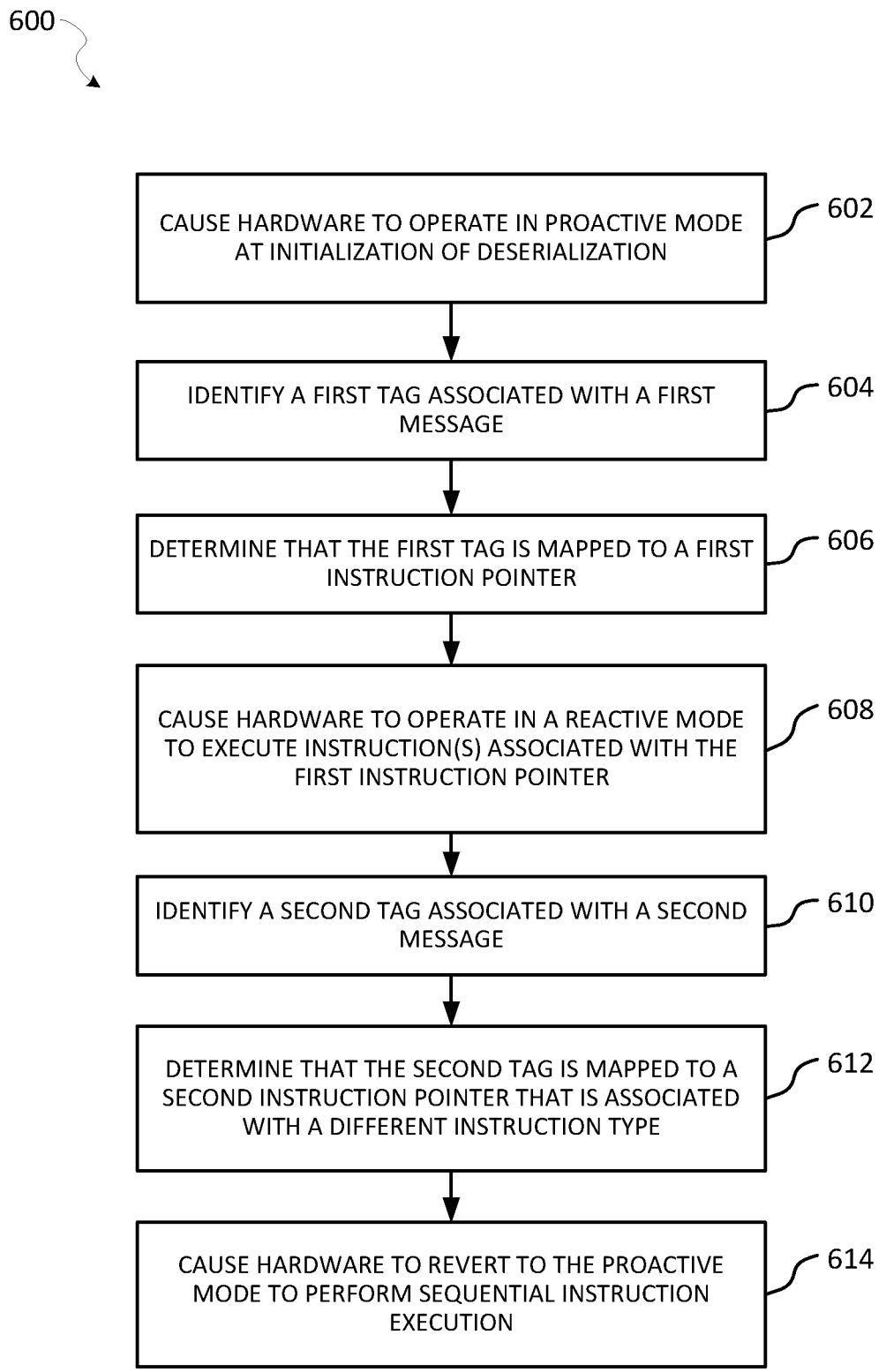

FIG. 6 is a flowchart illustrating an example method 600 for managing data, according to various embodiments. It will be understood that embodiment methods described herein can be performed by a machine in accordance with some embodiments. For embodiment, method 600 can be performed by the data management system 122 described with respect to FIG. 1, the data management system 200 described with respect to FIG. 2, the data management system described with respect to FIG. 3, or individual components thereof. An operation of various methods described herein can be performed by one or more data communication hardware (e.g., a network interface controller) and/or one or more hardware processors (e.g., central processing units or graphics processing units) of a computing device (e.g., a desktop, server, laptop, mobile phone, tablet, etc.), which can be part of a computing system based on a cloud architecture. Embodiment methods described herein can also be implemented in the form of executable instructions stored on a machine-readable medium or in the form of electronic circuitry. For instance, the operations of method 600 can be represented by executable instructions that, when executed by a data communication hardware or a processor of a computing device, cause the computing device to perform method 600. Depending on the embodiment, an operation of an example method described herein can be repeated in different ways or involve intervening operations not shown. Though the operations of embodiment methods can be depicted and described in a certain order, the order in which the operations are performed can vary among embodiments, including performing certain operations in parallel.

At operation 602, a data communication hardware operates in a proactive mode at initialization of deserialization.

At operation 604, a data communication hardware extracts one or more tags from one or more received data packets. Each tag represents a message type and a message value associated with the corresponding message. The data communication hardware identifies a tag (e.g., the first tag) associated with a message.

At operation 606, a data communication hardware determines that the tag is mapped to an instruction pointer (e.g., the first instruction pointer).

At operation 608, a data communication hardware operates in a reactive mode to execute one or more instructions associated with the instruction pointer.

At operation 610, a data communication hardware identifies a second tag associated with another message.

At operation 612, a data communication hardware determines that the second tag is mapped to another instruction pointer (e.g., a second instruction pointer) that is associated with another type of instruction (e.g., a second instruction).

At operation 614, a data communication hardware reverts to the default mode (i.e., proactive mode) to excuse the instructions associated with the second instruction pointer as well as sequential instructions.

Though not illustrated, the method 600 can include an operation where a graphical user interface for managing data can be displayed (or caused to be displayed) by the hardware processor. For instance, the operation can cause a computing device to display the graphical user interface for managing data across a variety of data sources. This operation for displaying the graphical user interface can be separate from operations 602 through 614 or, alternatively, form part of one or more of operations 602 through 614.

Figure 7:
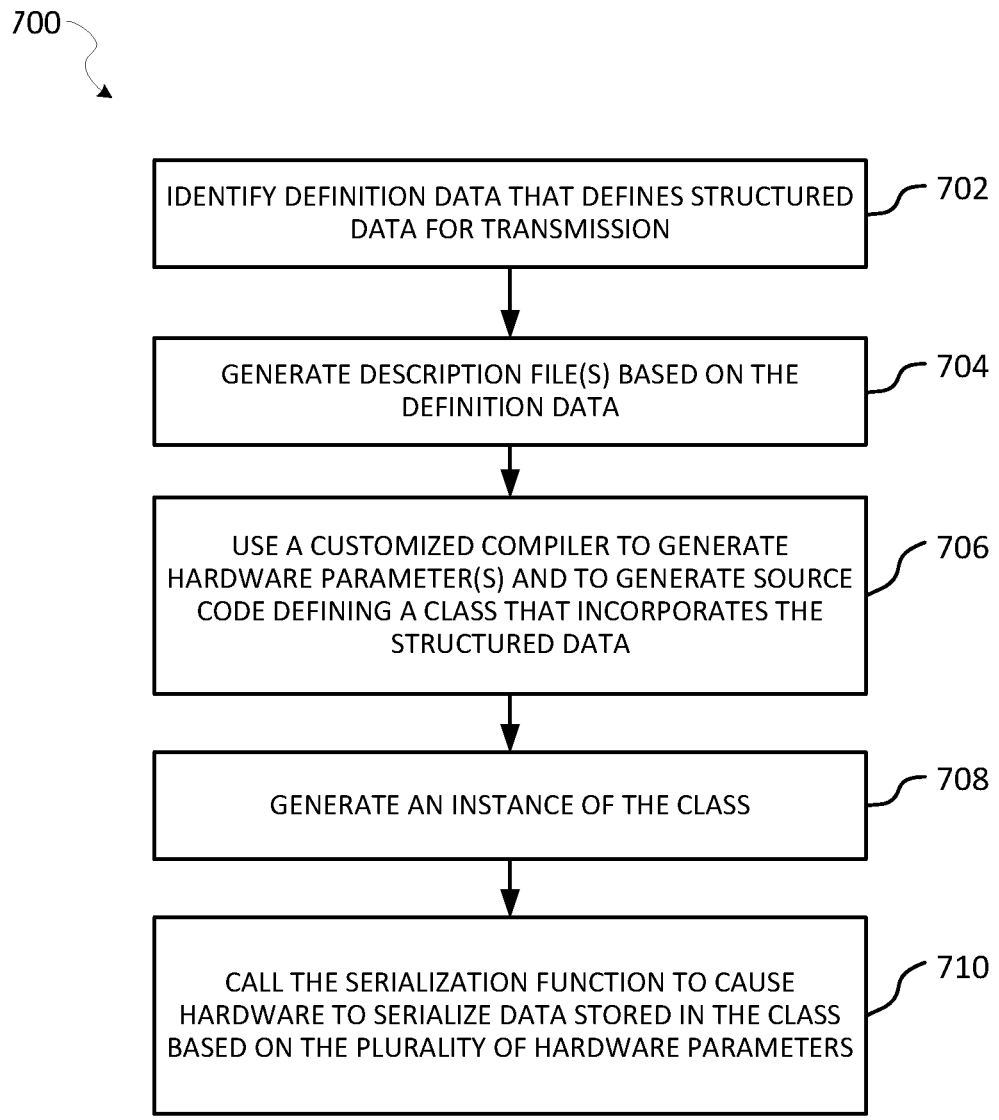

FIG. 7 is a flowchart illustrating an example method 700 for managing data, according to various embodiments. It will be understood that embodiment methods described herein can be performed by a machine in accordance with some embodiments. For embodiment, method 700 can be performed by the data management system 122 described with respect to FIG. 1, the data management system 200 described with respect to FIG. 2, or individual components thereof. An operation of various methods described herein can be performed one or more hardware processors (e.g., central processing units or graphics processing units) of a computing device (e.g., a desktop, server, laptop, mobile phone, tablet, etc.), which can be part of a computing system based on a cloud architecture. Embodiment methods described herein can also be implemented in the form of executable instructions stored on a machine-readable medium or in the form of electronic circuitry. For instance, the operations of method 700 can be represented by executable instructions that, when executed by a processor of a computing device, cause the computing device to perform method 700. Depending on the embodiment, an operation of an example method described herein can be repeated in different ways or involve intervening operations not shown. Though the operations of embodiment methods can be depicted and described in a certain order, the order in which the operations are performed can vary among embodiments, including performing certain operations in parallel.

At operation 702, a processor identifies structured data that needs to be transmitted to a recipient device and identifies definition data that defines the structured data.

At operation 704, a processor generates description files based on the definition data.

At operation 706, a processor uses a compiler that is customized to generate source code defining a class that incorporates the structure data. The class includes a definition of a serialization function that causes a data communication hardware to serialize the data (e.g., the instance variables with populated values) stored in the class. In various embodiments, the customized compiler is configured to generate a plurality of hardware parameters that are used by the data communication hardware to serialize data. The plurality of hardware parameters can include a pointer that identifies a location of a new instance of the class in the memory of the sender device and a plurality of identifiers of message types.

At operation 708, a processor, at run time, generates a new instance of the class, including populating instance variables in the class with values to be serialized.

At operation 710, a processor calls the serialization function of a new instance of the class to cause the data communication hardware of the sender device to serialize. The serialization is at least based on the plurality of hardware parameters and the data stored in the class.

Though not illustrated, method 700 can include an operation where a graphical user interface for managing data can be displayed (or caused to be displayed) by the hardware processor. For instance, the operation can cause a computing device to display the graphical user interface for managing data across a variety of data sources. This operation for displaying the graphical user interface can be separate from operations 702 through 710 or, alternatively, form part of one or more of operations 702 through 710.

Figure 8:
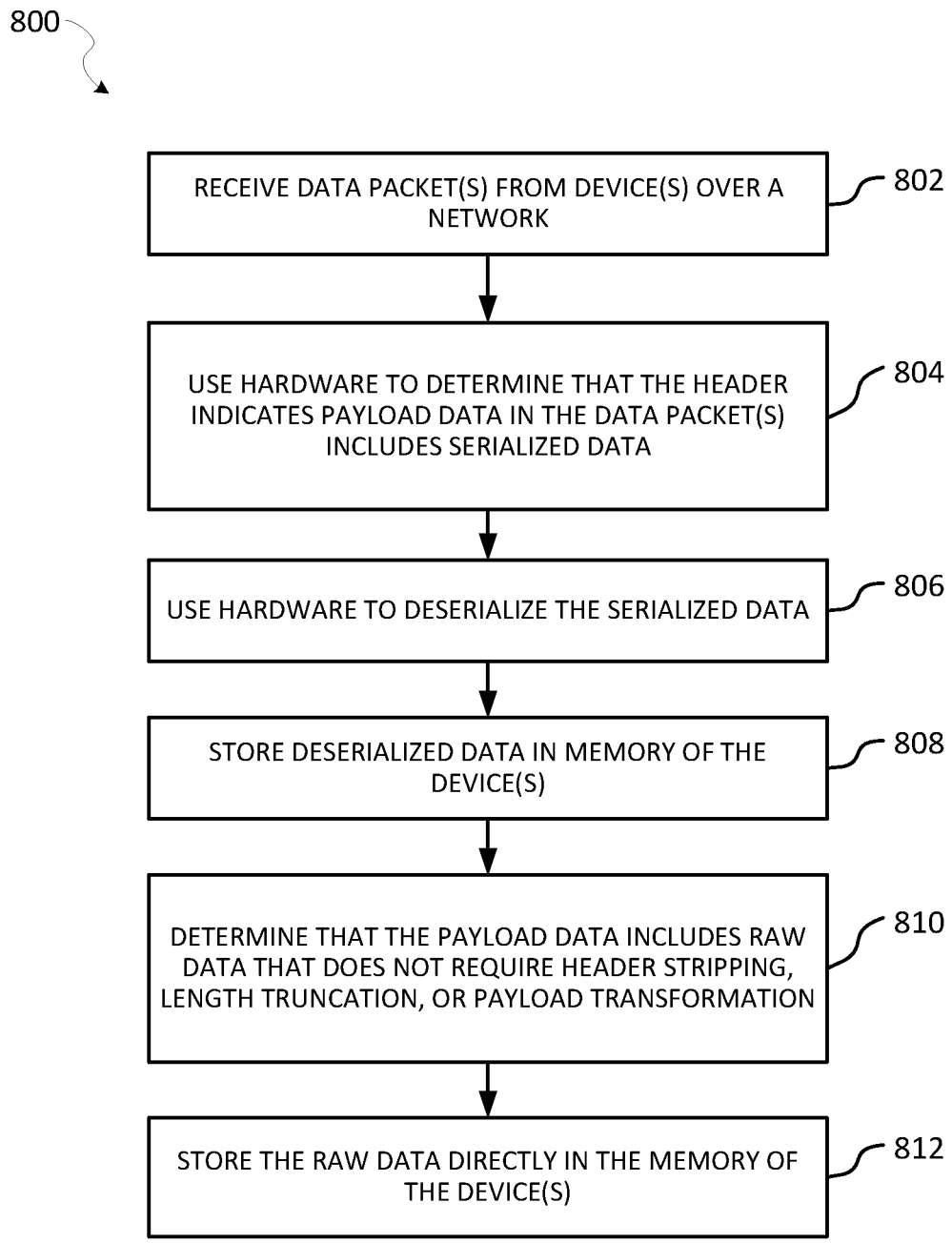

FIG. 8 is a flowchart illustrating an example method 800 for managing data, according to various embodiments. It will be understood that embodiment methods described herein can be performed by a machine in accordance with some embodiments. In various embodiments, method 800 can be performed by the data management system 122 described with respect to FIG. 1, the data management system 200 described with respect to FIG. 2, or individual components thereof. An operation of various methods described herein can be performed by one or more data communication hardware (e.g., a network interface controller) and/or one or more hardware processors (e.g., central processing units or graphics processing units) of a computing device (e.g., a desktop, server, laptop, mobile phone, tablet, etc.), which can be part of a computing system based on a cloud architecture. Embodiment methods described herein can also be implemented in the form of executable instructions stored on a machine-readable medium or in the form of electronic circuitry. For instance, the operations of method 800 can be represented by executable instructions that, when executed by a data communication hardware or a processor of a computing device, cause the computing device to perform method 800. Depending on the embodiment, an operation of an example method described herein can be repeated in different ways or involve intervening operations not shown. Though the operations of embodiment methods can be depicted and described in a certain order, the order in which the operations are performed can vary among embodiments, including performing certain operations in parallel.

At operation 802, one or more data packets from the sender device are received at a data communication hardware. Each data packet includes a header and payload data.

At operation 804, a data communication hardware determines that one or more headers indicate that the payload data includes serialized data.

At operation 806, a data communication hardware deserializes the serialized byte string by converting the serialized byte string into one or more data structures.

At operation 808, a data communication hardware stores the one or more data structures in a memory of the recipient device.

At operation 810, a data communication hardware determines the payload data includes raw data that does not require header stripping, length truncation, or payload transformation.

At operation 812, a data communication hardware stores the raw data directly in the memory of the recipient device.

In various embodiments, upon determining that a data packet includes serialized data, a data communication hardware stores the data packet in a temporary buffer of the data communication hardware that includes a plurality of received data packets for deserialization.

In various embodiments, a data communication hardware can deserialize multiple received data packets in parallel.

Though not illustrated, method 800 can include an operation where a graphical user interface for managing data can be displayed (or caused to be displayed) by the hardware processor. For instance, the operation can cause a computing device to display the graphical user interface for managing data across a variety of data sources. This operation for displaying the graphical user interface can be separate from operations 802 through 812 or, alternatively, form part of one or more of operations 802 through 812.

Figure 9:
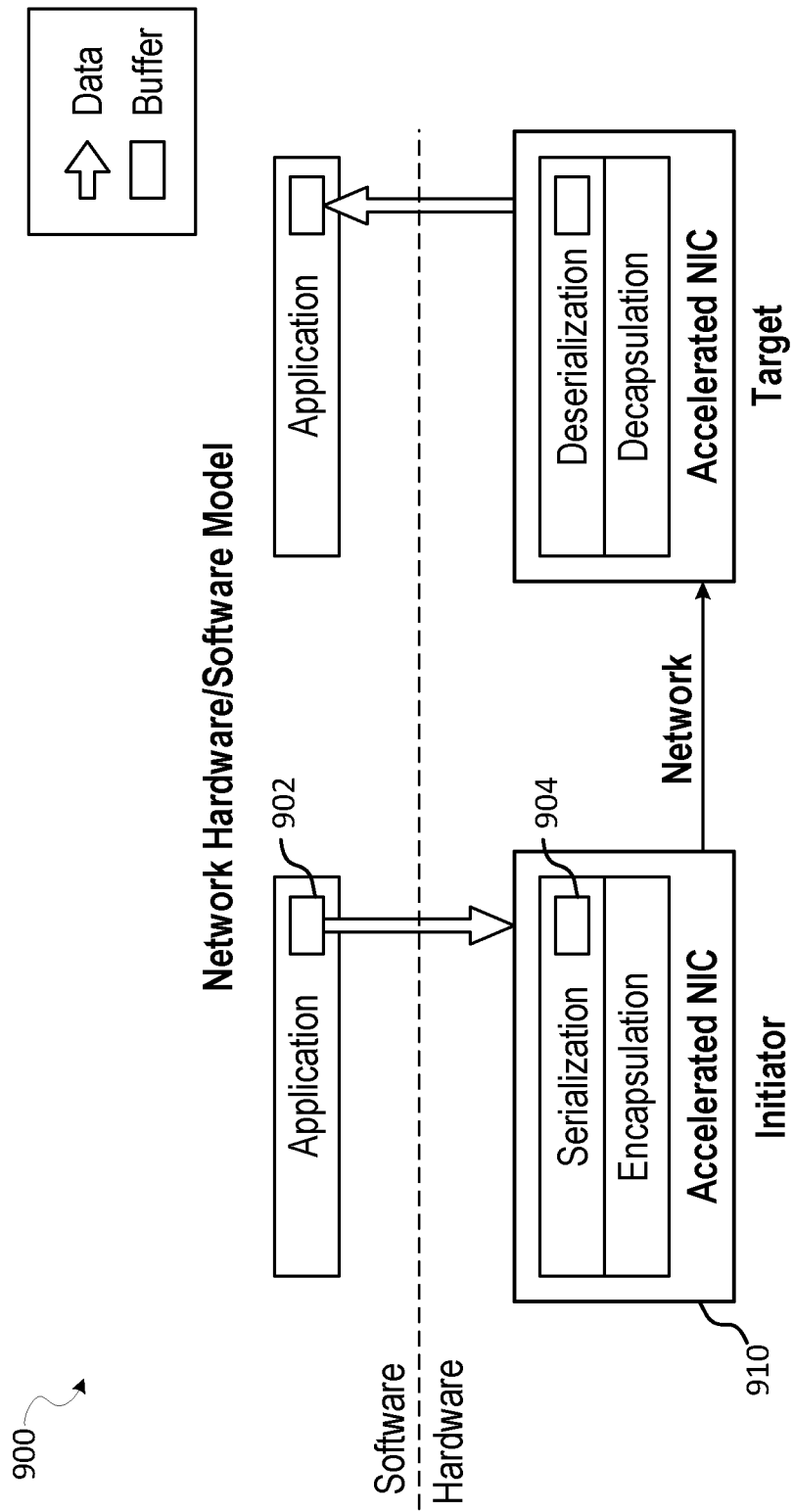
FIG. 9 is a block diagram illustrating an example network hardware and software model implemented by an example data management system, according to various embodiments.

FIG. 9 is a block diagram illustrating an example network hardware and software model 900 implemented by an example data management system, according to various embodiments. As shown, a data communication hardware 910 is a network interface controller that includes serialization and encapsulation hardware components, as described herein. Under this approach, structured data that needs to be serialized is copied once from buffer 902 to buffer 904. In contrast, under the traditional approach, where a network software model handles serialization and encapsulation, structured data needs to be copied from buffer to buffer, causing the process to be significantly compute-intensive. For example, in a typical network software model (not shown), structured data needs to be copied from a buffer of an application layer to a buffer of a serialization layer to a buffer of an encapsulation layer before being transmitted to the network interface controller for transmission over a network. Using hardware to perform operations such as serialization and encapsulation can significantly reduce system latency and optimize system performance. The same concept and advantages apply to hardware deserialization and decapsulation operations, as described herein.

Figure 10:
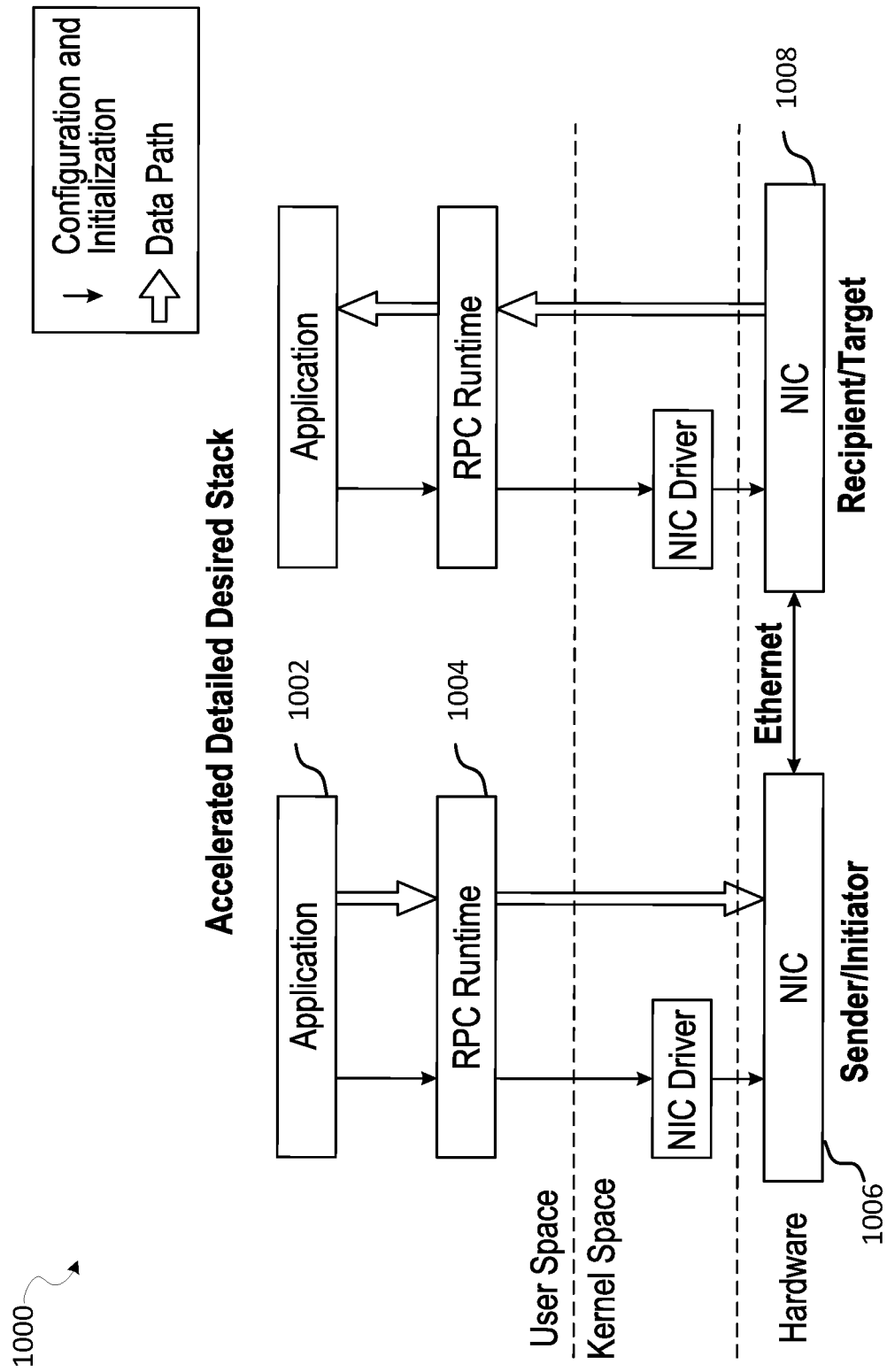
FIG. 10 is a block diagram illustrating an example detailed stack implemented by an example data management system, according to various embodiments.

FIG. 10 is a block diagram illustrating an example detailed stack 1000 implemented by an example data management system, according to various embodiments. As shown, an application 1002 calls a remote procedure via a remote procedure call (RPC) 1004 to initiate hardware serialization and encapsulation operations performed by data communication hardware (e.g., NIC 1006). The NIC 1006 transmits one or more data packets, as described herein, to NIC 1008 of the recipient device, and the process is reversed. Specifically, the NIC 1008 performs decapsulation and deserialization operations and passes the deserialized data to CPUs of the recipient device for processing.

Figure 11:
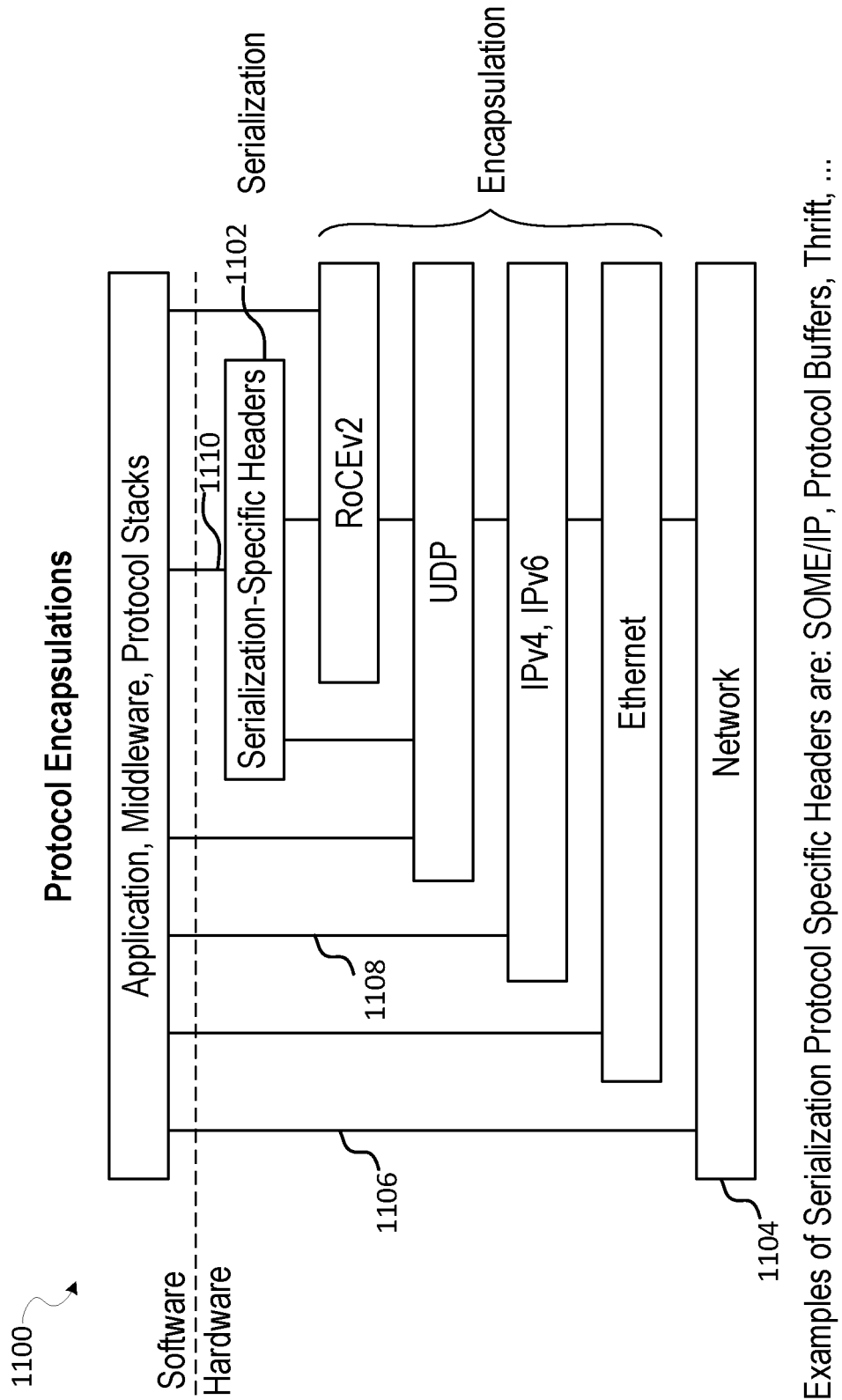
FIG. 11 is a block diagram illustrating an example protocol encapsulation architecture implemented by an example data management system, according to various embodiments.

FIG. 11 is a block diagram illustrating an example protocol encapsulation architecture 1100 implemented by an example data management system, according to various embodiments. As shown, a data communication hardware appends headers to one or more data packets that contain serialized data based on one or more network protocols. As described herein, the one or more data packets include one or more serialization protocol-specific headers 1102 (also referred to as serialization specific header) that are associated with one or more network protocols. The one or more network protocols include at least one of Scalable Service-Oriented Middleware over IP (SOME/IP) protocol, Protocol Buffers protocol, or Thrift protocol. This approach allows flexibility in allowing various types of encapsulations configured for various amounts of hardware acceleration.

As shown, the vertical lines represent paths (e.g., path 1106) of various supported workload options. For example, under path 1106, a data management system can request hardware transmit data packets over network 1104 without appending headers (e.g., serialization headers or network headers) to a recipient device. Under path 1108, a data management system can request hardware to append headers associated with network protocols IPv4, IPv6, and Ethernet before transmitting data packets over network 1004. Under path 1110, a data management system can request hardware to append serialization-specific headers and network headers of all the network protocols, as shown, before transmitting data packets over network 1104.

Figure 12:
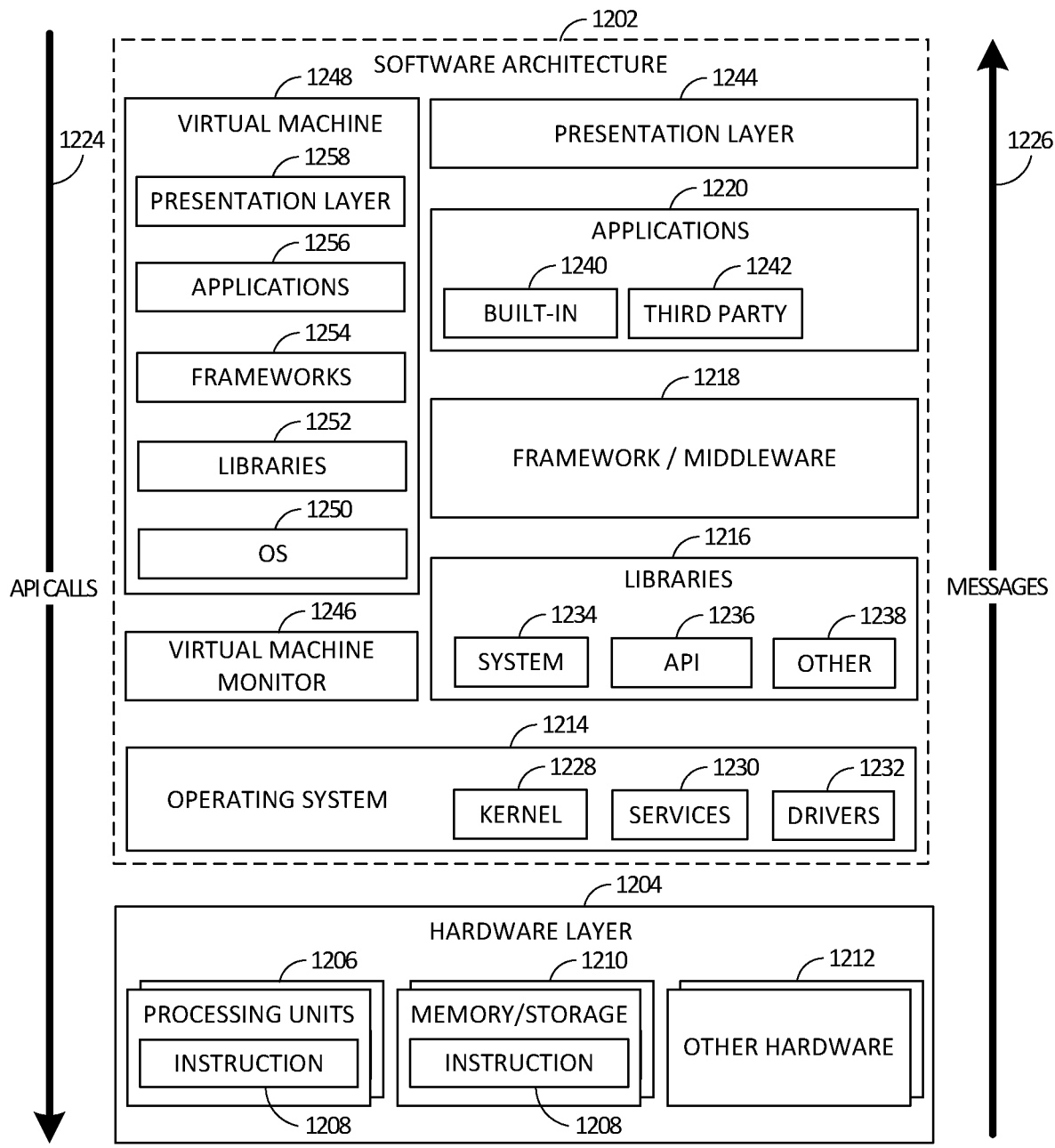
FIG. 12 is a block diagram illustrating a representative software architecture, which can be used in conjunction with various hardware architectures herein described, according to various embodiments.

FIG. 12 is a block diagram illustrating an example of a software architecture 1202 that can be installed on a machine, according to some embodiments. FIG. 12 is merely a non-limiting embodiment of a software architecture, and it will be appreciated that many other architectures can be implemented to facilitate the functionality described herein. The software architecture 1202 can be executing on hardware such as a machine 1300 of FIG. 13 that includes, among other things, processors 1310, memory 1330, and input/output (I/O) components 1350. A representative hardware layer 1204 is illustrated and can represent, for embodiment, the machine 1300 of FIG. 13. The representative hardware layer 1204 comprises one or more processing units 1206 having associated executable instructions 1208. The executable instructions 1208 represent the executable instructions of the software architecture 1202. The hardware layer 1204 also includes memory or storage modules 1210, which also have the executable instructions 1208. The hardware layer 1204 can also comprise other hardware 1212, which represents any other hardware of the hardware layer 1204, such as the other hardware illustrated as part of the machine 1300.

In the embodiment architecture of FIG. 12, the software architecture 1202 can be conceptualized as a stack of layers, where each layer provides particular functionality. For embodiment, the software architecture 1202 can include layers such as an operating system 1214, libraries 1216, frameworks/middleware 1218, applications 1220, and a presentation layer 1244. Operationally, the applications 1220 or other components within the layers can invoke API calls 1224 through the software stack and receive a response, returned values, and so forth (illustrated as messages 1226) in response to the API calls 1224. The layers illustrated are representative in nature, and not all software architectures have all layers. For embodiment, some mobile or special-purpose operating systems can not provide a frameworks/middleware 1218 layer, while others can provide such a layer. Other software architectures can include additional or different layers.

The operating system 1214 can manage hardware resources and provide common services. The operating system 1214 can include, for embodiment, a kernel 1228, services 1230, and drivers 1232. The kernel 1228 can act as an abstraction layer between the hardware and the other software layers. For embodiment, the kernel 1228 can be responsible for memory management, processor management (e.g., scheduling), component management, networking, security settings, and so on. The services 1230 can provide other common services for the other software layers. The drivers 1232 can be responsible for controlling or interfacing with the underlying hardware. For instance, the drivers 1232 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 can provide a common infrastructure that can be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, or drivers 1232). The libraries 1216 can include system libraries 1234 (e.g., C standard library) that can provide functions such as memory allocation functions, string manipulation functions, mathematic functions, and the like. In addition, the libraries 1216 can include API libraries 1236 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries (e.g., SQLite that can provide various relational database functions), web libraries (e.g., WebKit that can provide web browsing functionality), and the like. The libraries 1216 can also include a wide variety of other libraries 1238 to provide many other APIs to the applications 1220 and other software components/modules.

The frameworks 1218 (also sometimes referred to as middleware) can provide a higher-level common infrastructure that can be utilized by the applications 1220 or other software components/modules. For embodiment, the frameworks 1218 can provide various graphical user interface functions, high-level resource management, high-level location services, and so forth. The frameworks 1218 can provide a broad spectrum of other APIs that can be utilized by the applications 1220 and/or other software components/modules, some of which can be specific to a particular operating system or platform.

The applications 1220 include built-in applications 1240 and/or third-party applications 1242. Embodiments of representative built-in applications 1240 can include, but are not limited to, a home application, a contacts application, a browser application, a book reader application, a location application, a media application, a messaging application, or a game application.

The third-party applications 1242 can include any of the built-in applications 1240, as well as a broad assortment of other applications. In a specific embodiment, the third-party applications 1242 (e.g., an application developed using the Android™ or iOS™ software development kit (SDK) by an entity other than the vendor of the particular platform) can be mobile software running on a mobile operating system such as iOS™, Android™, or other mobile operating systems. In this embodiment, the third-party applications 1242 can invoke the API calls 1224 provided by the mobile operating system such as the operating system 1214 to facilitate functionality described herein.

The applications 1220 can utilize built-in operating system functions (e.g., kernel 1228, services 1230, or drivers 1232), libraries (e.g., system libraries 1234, API libraries 1236, and other libraries 1238), or frameworks/middleware 1218 to create user interfaces to interact with users of the system. Alternatively, or additionally, in some systems, interactions with a user can occur through a presentation layer, such as the presentation layer 1244. In these systems, the application/module "logic" can be separated from the aspects of the application/module that interact with the user.

Some software architectures utilize virtual machines. In the embodiment of FIG. 12, this is illustrated by a virtual machine 1248. The virtual machine 1248 creates a software environment where applications/modules can execute as if they were executing on a hardware machine (e.g., the machine 1300 of FIG. 13). The virtual machine 1248 is hosted by a host operating system (e.g., the operating system 1214) and typically, although not always, has a virtual machine monitor 1246, which manages the operation of the virtual machine 1248 as well as the interface with the host operating system (e.g., the operating system 1214). A software architecture executes within the virtual machine 1248, such as an operating system 1250, libraries 1252, frameworks/middleware 1254, applications 1256, or a presentation layer 1258. These layers of software architecture executing within the virtual machine 1248 can be the same as corresponding layers previously described or can be different.

Figure 13:
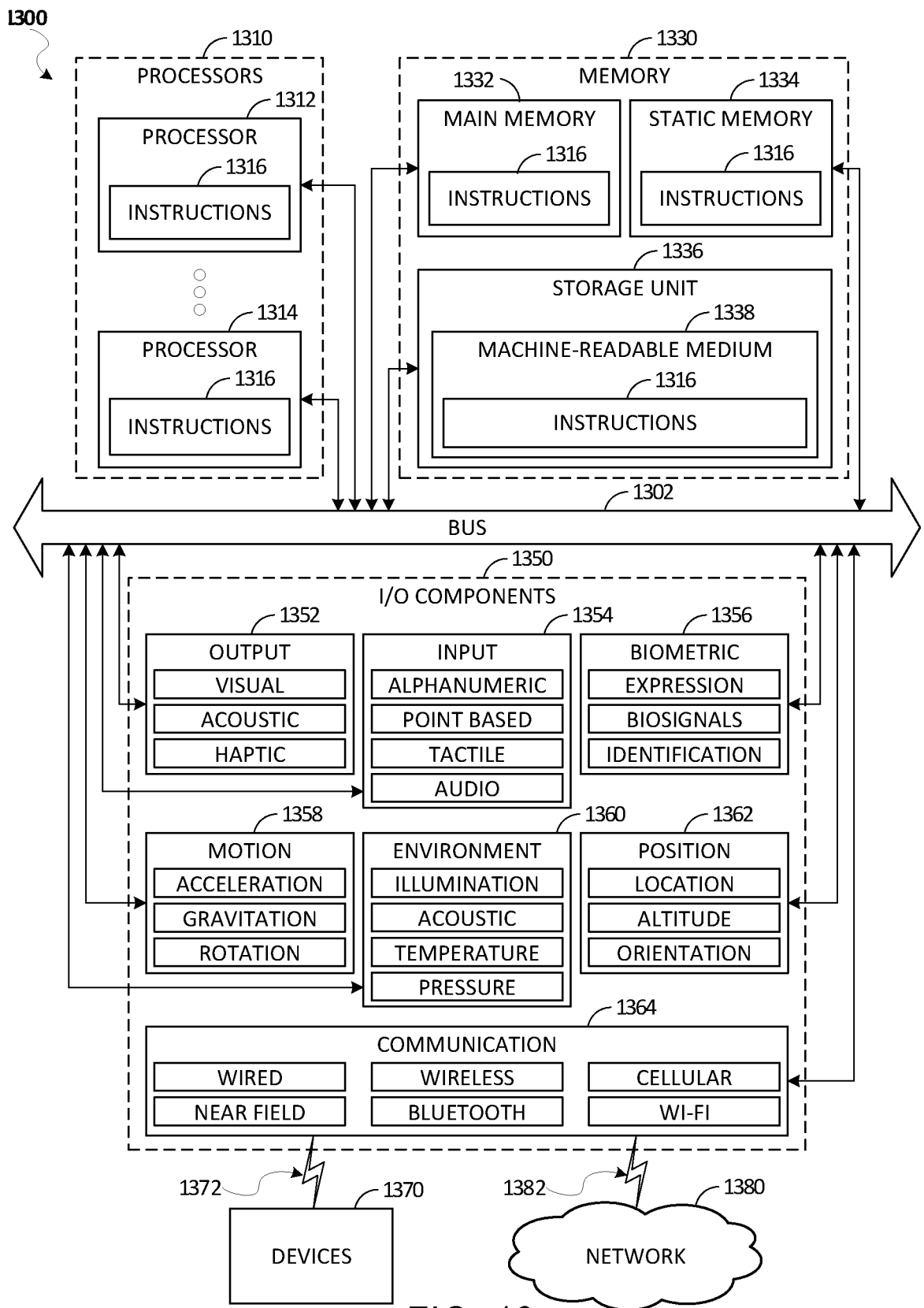
FIG. 13 is a block diagram illustrating components of a machine able to read instructions from a machine storage medium and perform any one or more of the methodologies discussed herein according to various embodiments.

FIG. 13 illustrates a diagrammatic representation of a machine 1300 in the form of a computer system within which a set of instructions can be executed for causing the machine 1300 to perform any one or more of the methodologies discussed herein, according to an embodiment. Specifically, FIG. 13 shows a diagrammatic representation of the machine 1300 in the embodiment form of a computer system, within which instructions 1316 (e.g., software, a program, an application, an applet, an app, or other executable code) for causing the machine 1300 to perform any one or more of the methodologies discussed herein can be executed. For embodiment, the instructions 1316 can cause the machine 1300 to execute the method 400 described above with respect to FIG. 4, the method 500 described above with respect to FIG. 5, the method 600 described above with respect to FIG. 6, the method 700 described above with respect to FIG. 7. The instructions 1316 transform the general, non-programmed machine 1300 into a particular machine 1300 programmed to carry out the described and illustrated functions in the manner described. In some embodiments, the machine 1300 operates as a standalone device or can be coupled (e.g., networked) to other machines. In a networked deployment, the machine 1300 can operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 can include processors 1310, memory 1330, and I/O components 1350, which can be configured to communicate with each other such as via a bus 1302. In an embodiment, the processors 1310 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for embodiment, a processor 1312 and a processor 1314 that can execute the instructions 1316. The term "processor" is intended to include multi-core processors that can comprise two or more independent processors (sometimes referred to as "cores") that can execute instructions contemporaneously. Although FIG. 13 shows multiple processors 1310, the machine 1300 can include a single processor with a single core, a single processor with multiple cores (e.g., a multi-core processor), multiple processors with a single core, multiple processors with multiples cores, or any combination thereof.

The memory 1330 can include a main memory 1332, a static memory 1334, and a storage unit 1336 including machine-readable medium 1338, each accessible to the processors 1310 such as via the bus 1302. The main memory 1332, the static memory 1334, and the storage unit 1336 store the instructions 1316 embodying any one or more of the methodologies or functions described herein. The instructions 1316 can also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 can include a wide variety of components to receive input, provide output, produce output, transmit information, exchange information, capture measurements, and so on. The specific I/O components 1350 that are included in a particular machine will depend on the type of machine. For embodiment, portable machines such as mobile phones will likely include a touch input device or other such input mechanisms, while a headless server machine will likely not include such a touch input device. It will be appreciated that the I/O components 1350 can include many other components that are not shown in FIG. 13. The I/O components 1350 are grouped according to functionality merely for simplifying the following discussion, and the grouping is in no way limiting. In various embodiments, the I/O components 1350 can include output components 1352 and input components 1354. The output components 1352 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1350 can include biometric components 1356, motion components 1358, environmental components 1360, or position components 1362, among a wide array of other components. The motion components 1358 can include acceleration sensor components (e.g., accelerometer), gravitation sensor components, rotation sensor components (e.g., gyroscope), and so forth. The environmental components 1360 can include, for embodiment, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1362 can include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1350 can include communication components 1364 operable to couple the machine 1300 to a network 1380 or devices 1370 via a coupling 1382 and a coupling 1372, respectively. For embodiment, the communication components 1364 can include a network interface component or another suitable device to interface with the network 1380. In further embodiments, the communication components 1364 can include wired communication components, wireless communication components, cellular communication components, near field communication (NFC) components, Bluetooth© components (e.g., Bluetooth© Low Energy), Wi-Fi© components, and other communication components to provide communication via other modalities. The devices 1370 can be another machine or any of a wide variety of peripheral devices (e.g., a peripheral device coupled via a USB).

Moreover, the communication components 1364 can detect identifiers or include components operable to detect identifiers. For embodiment, the communication components 1364 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1364, such as location via Internet Protocol (IP) geolocation, location via Wi-Fi® signal triangulation, location via detecting an NFC beacon signal that can indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For embodiment, a hardware module can include dedicated circuitry or logic that is permanently configured to perform certain operations. For embodiment, a hardware module can be a special-purpose processor, such as a field-programmable gate array (FPGA) or an ASIC. A hardware module can also include programmable logic or circuitry that is temporarily configured by software to perform certain operations. For embodiment, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. In various embodiments, where a hardware module includes a general-purpose processor configured by software to become a special-purpose processor, the general-purpose processor can be configured as respectively different special-purpose processors (e.g., comprising different hardware modules) at different times. Software can accordingly configure a particular processor or processors, for embodiment, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules can be achieved, for embodiment, through the storage and retrieval of information in memory structures to which the multiple hardware modules have access. For embodiment, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of embodiment methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For embodiment, at least some of the operations of a method can be performed by one or more processors or processor-implemented modules. Moreover, the one or more processors can also operate to support performance of the relevant operations in a "cloud computing" environment or as a "software as a service" (SaaS). For embodiment, at least some of the operations can be performed by a group of computers (as embodiments of machines 1300 including processors 1310), with these operations being accessible via a network (e.g., the Internet) and via one or more appropriate interfaces (e.g., an API). In certain embodiments, for embodiment, a client device can relay or operate in communication with cloud computing systems and can access circuit design information in a cloud environment.

The performance of certain of the operations can be distributed among the processors, not only residing within a single machine 1300, but deployed across a number of machines 1300. In some embodiment embodiments, the processors 1310 or processor-implemented modules are located in a single geographic location (e.g., within a home environment, an office environment, or a server farm). In other embodiments, the processors or processor-implemented modules are distributed across a number of geographic locations.

Executable Instructions and Machine Storage Medium

The various memories (i.e., 1330, 1332, 1334, and/or the memory of the processor(s) 1310) and/or the storage unit 1336 can store one or more sets of instructions 1316 and data structures (e.g., software) embodying or utilized by any one or more of the methodologies or functions described herein. These instructions (e.g., the instructions 1316), when executed by the processor(s) 1310, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 1316 and/or data. The terms shall accordingly be taken to include, but not be limited to, solid-state memories, and optical and magnetic media, including memory internal or external to processors. Specific embodiments of machine-storage media, computer-storage media and/or device-storage media include non-volatile memory, including by way of embodiment semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1380 can be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For embodiment, the network 1380 or a portion of the network 1380 can include a wireless or cellular network, and the coupling 1382 can be a Code Division Multiple Access (CDMA) connection, a Global System for Mobile communications (GSM) connection, or another type of cellular or wireless coupling. In this embodiment, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions can be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions can be transmitted or received using a transmission medium via the coupling (e.g., a peer-to-peer coupling) to the devices 1370. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances can implement resources, components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in embodiment configurations can be implemented as a combined structure or component. Similarly, structures and functionality presented as a single component can be implemented as separate components.

As used herein, the term "or" can be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases can be absent. Additionally, boundaries between various resources, operations, modules, engines, and data stores are somewhat arbitrary, and particular operations are illustrated in a context of specific illustrative configurations. Other allocations of functionality are envisioned and can fall within a scope of various embodiments. The specification and drawings are, accordingly, to be regarded in an illustrative rather than a restrictive sense.

It will be understood that changes and modifications can be made to the disclosed embodiments without departing from the scope of the present disclosure. These and other changes or modifications are intended to be included within the scope of the present disclosure.

What is claimed is:

1. A method comprising:
    receiving, at data communication hardware of a first electronic device, one or more data packets from a second electronic device over a network; and
    using the data communication hardware to perform operations comprising:
        decapsulating the one or more data packets to retrieve a serialized byte string from the one or more data packets;
        deserializing the serialized byte string, the deserializing comprising converting the serialized byte string into one or more data structures;
        storing the one or more data structures in a memory of the first electronic device;
        identifying, from at least one data packet of the one or more data packets, a tag associated with a message from one or more messages that the second electronic device used to generate the serialized byte string;
        determining that the tag is mapped to an instruction pointer; and
        causing the data communication hardware to operate in a reactive mode to execute an instruction associated with the instruction pointer.

2. The method of claim 1, wherein the identifying, from at least one data packet of the one or more data packets, the tag comprises:
    extracting one or more tags from the one or more data packets, each tag representing a message type and a message value associated with an individual message from the one or more messages.

3. The method of claim 1, wherein the data communication hardware of the first electronic device operates in a proactive mode at initialization.

4. The method of claim 1, wherein the tag is a first tag, wherein the instruction is a first instruction, wherein the instruction pointer is a first instruction pointer, and wherein the data communication hardware performs the operations further comprising:
    identifying, from at least one data packet of the one or more data packets, a second tag associated with a second message from the one or more messages;
    determining that the second tag is mapped to a second instruction pointer associated with a second instruction of a different type compared to the first instruction; and
    causing the data communication hardware to operate in a proactive mode to execute the second instruction and sequential instructions.

5. The method of claim 1, wherein the message includes one or more of a scalar, a string, an array, and an embedded message.

6. The method of claim 1, wherein the data communication hardware performs the operations further comprising:
processing the one or more data structures from the memory of the first electronic device based on one or more tags extracted from the one or more data packets.

7. The method of claim 1, wherein the data communication hardware of the first electronic device comprises a network interface controller of the first electronic device.

8. The method of claim 1, wherein the one or more data packets comprise one or more serialization protocol specific headers that are associated with one or more network protocols, the one or more network protocols comprising at least one of Scalable service-Oriented Middleware over IP (SOME/IP) protocol, Protocol Buffers protocol, or Thrift protocol.

9. The method of claim 1, wherein the one or more data structures stored in the memory are in-memory representations of the one or more messages.

10. The method of claim 1, wherein the data communication hardware of the first electronic device comprises a deserialization microprocessor of the first electronic device.

11. A system comprising:
a memory storing instructions; and
one or more hardware processors communicatively coupled to the memory and configured by the instructions to perform operations comprising:
receiving, at data communication hardware of a first electronic device, one or more data packets from a second electronic device over a network; and
using the data communication hardware to perform operations comprising:
decapsulating the one or more data packets to retrieve a serialized byte string from the one or more data packets;
deserializing the serialized byte string, the deserializing comprising converting the serialized byte string into one or more data structures;
storing the one or more data structures in a memory of the first electronic device;
identifying, from at least one data packet of the one or more data packets, a tag associated with a message from one or more messages that the second electronic device used to generate the serialized byte string;
determining that the tag is mapped to an instruction pointer; and
causing the data communication hardware to operate in a reactive mode to execute an instruction associated with the instruction pointer.

12. The system of claim 11, wherein the identifying, from at least one data packet of the one or more data packets, the tag comprises:
extracting one or more tags from the one or more data packets, each tag representing a message type and a message value associated with an individual message from the one or more messages.

13. The system of claim 11, wherein the data communication hardware of the first electronic device operates in a proactive mode at initialization.

14. The system of claim 11, wherein the tag is a first tag, wherein the instruction is a first instruction, wherein the instruction pointer is a first instruction pointer, and wherein the data communication hardware performs the operations further comprising:
identifying, from at least one data packet of the one or more data packets, a second tag associated with a second message from the one or more messages;
determining that the second tag is mapped to a second instruction pointer associated with a second instruction of a different type compared to the first instruction; and
causing the data communication hardware to operate in a proactive mode to execute the second instruction and sequential instructions.

15. The system of claim 11, wherein the message includes one or more of a scalar, a string, an array, and an embedded message.

16. The system of claim 11, wherein the data communication hardware performs the operations further comprising:
processing the one or more data structures from the memory of the first electronic device based on one or more tags extracted from the one or more data packets.

17. The system of claim 11, wherein the data communication hardware of the first electronic device comprises a network interface controller of the first electronic device.

18. The system of claim 11, wherein the one or more data packets comprise one or more serialization protocol specific headers that are associated with one or more network protocols, the one or more network protocols comprising at least one of Scalable service-Oriented Middleware over IP (SOME/IP) protocol, Protocol Buffers protocol, or Thrift protocol.

19. The system of claim 11, wherein the one or more data structures stored in the memory are in-memory representations of the one or more messages.

20. A non-transitory computer-readable medium comprising instructions that, when executed by a hardware processor of a device, cause the device to perform operations comprising:
receiving, at data communication hardware of a first electronic device, one or more data packets from a second electronic device over a network; and
using the data communication hardware to perform operations comprising:
decapsulating the one or more data packets to retrieve a serialized byte string from the one or more data packets;
deserializing the serialized byte string, the deserializing comprising converting the serialized byte string into one or more data structures;
storing the one or more data structures in a memory of the first electronic device;
identifying, from at least one data packet of the one or more data packets, a tag associated with a message from one or more messages that the second electronic device used to generate the serialized byte string;
determining that the tag is mapped to an instruction pointer; and
causing the data communication hardware to operate in a reactive mode to execute an instruction associated with the instruction pointer.

* * * * *